United States Patent
Feldman et al.

(10) Patent No.: US 6,938,924 B2
(45) Date of Patent: Sep. 6, 2005

(54) VEHICLE ANTI-ROLLOVER SYSTEM

(75) Inventors: Yakov Feldman, deceased, late of West Hollywood, CA (US); by Alla Groberman, legal representative, 1256 N. Gardner St., West Hollywood, CA (US) 90046

(73) Assignee: Alla Groberman, Los Angeles, CA (US)

( * ) Notice: Subject to any disclaimer, the term of this patent is extended or adjusted under 35 U.S.C. 154(b) by 89 days.

(21) Appl. No.: 10/151,681

(22) Filed: May 20, 2002

(65) Prior Publication Data

US 2003/0213636 A1 Nov. 20, 2003

(51) Int. Cl.[7] ............................................. B60R 21/13
(52) U.S. Cl. ........................................ 280/755; 180/282
(58) Field of Search .............................. 180/271, 274, 180/281, 282; 280/755, 764.1, 766.1, 763.1

(56) References Cited

U.S. PATENT DOCUMENTS

| | | | | |
|---|---|---|---|---|
| 3,580,354 A | * | 5/1971 | Hewitt | 180/282 |
| 4,386,674 A | * | 6/1983 | Sugata | 180/422 |
| 5,590,736 A | * | 1/1997 | Morris et al. | 180/282 |
| 5,890,084 A | * | 3/1999 | Halasz et al. | 701/45 |
| 5,931,499 A | * | 8/1999 | Sutherland | 180/755 |
| 6,170,594 B1 | * | 1/2001 | Gilbert | 180/282 |
| 6,282,474 B1 | * | 8/2001 | Chou et al. | 701/45 |
| 6,290,019 B1 | * | 9/2001 | Kolassa et al. | 180/282 |
| 6,394,738 B1 | * | 5/2002 | Springer | 414/673 |
| 6,556,908 B1 | * | 4/2003 | Lu et al. | 701/38 |
| 6,588,799 B1 | * | 7/2003 | Sanchez | 280/755 |
| 6,648,367 B2 | * | 11/2003 | Breed et al. | 280/730.1 |
| 2002/0189883 A1 | * | 12/2002 | Lahmann et al. | 180/282 |

FOREIGN PATENT DOCUMENTS

| | | | |
|---|---|---|---|
| FR | 2548996 | * | 1/1985 |
| GB | 2163585 | * | 2/1986 |

* cited by examiner

*Primary Examiner*—Peter M. Poon
*Assistant Examiner*—David Parsley

(57) ABSTRACT

A vehicle anti-rollover system including at least one gas generator which discharges a gas flow sideways, to an atmosphere where the vehicle is rolling over under a rollover force of the vehicle, when the gas generator is activated or actuated during a vehicle rollover. A predetermined force of the gas flow produces a reactive force applied to the vehicle. The rollover force of the vehicle is directed sideways where the vehicle is rolling over, while the reactive force of the gas flow of the anti-rollover system is directed sideways in an opposite direction. Thus, the reactive force of the gas flow reduces the rollover force and minimizes the risk of a rollover crash or rolling over and serious vehicle occupant's injuries. In a vehicle unstable or rollover situation to avoid a vehicle rolling over, the system also allows the vehicle occupant to actuate the gas generator and to stabilize the vehicle almost instantly.

3 Claims, 3 Drawing Sheets

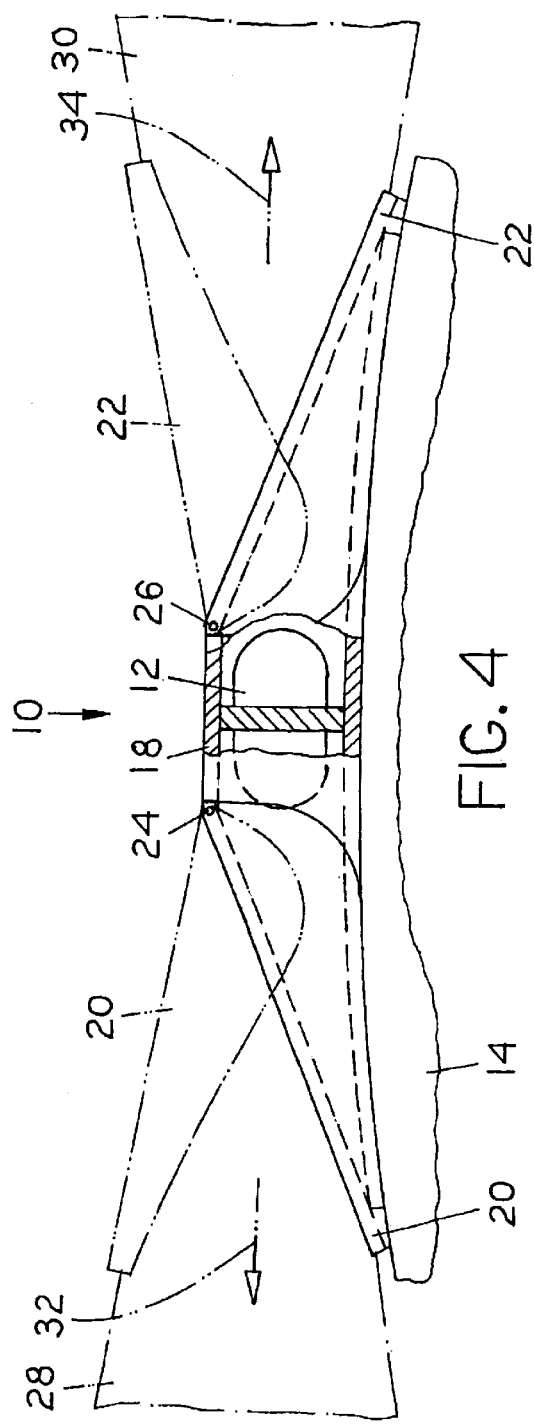
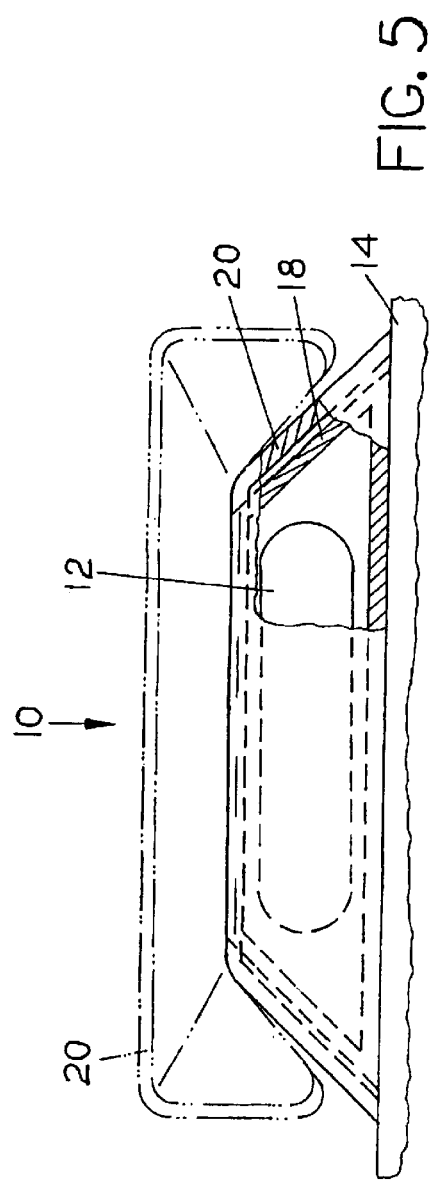

VEHICLE ANTI-ROLLOVER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to a vehicle anti-rollover system, in particular to a gas anti-rollover system which discharges a flow of gas sideways where the vehicle is rolling over and which reduces the rollover force of the vehicle.

Rollover crashes are complex events that reflect the interaction of driver, road, vehicle, and environmental factors. Most rollover crashes occur when a vehicle runs off the road and is tripped by a ditch, curb, soft soil, or other object causing it to rollover. These crashes are usually caused by driver behavior such as speeding or inattention. These are called single vehicle crashes because the crash did not involve a collision with another vehicle.

From studies of real-world single-vehicle crashes, NHTSA (National Highway Traffic Safety Administration) has determined that more than 90% of rollovers occur after a driver runs off of the road. This does not refer to vehicles trying to negotiate difficult trails away from public roads. It refers to vehicles rolling over off of the pavement after the driver has lost control of the vehicle. Once the vehicle slides off of the pavement, a ditch, soft soil, curb or other tripping mechanism usually initiates the rollover (Rollover Resistance Ratings Information, NHTSA, 2001).

Based on Static Stability Factor studies, NHTSA found that taller, narrower vehicles, such as sport utility vehicles (SUVs), are more likely than lower, wider vehicles, such as passenger cars, to trip and roll over once they leave the roadway.

All types of vehicles roll over in certain conditions. While SUVs have the highest number of rollover crashes, because of the higher numbers of passenger cars on the road, almost half of all rollovers involved passenger cars (Rollover Resistance Ratings Information, NHTSA, 2001).

When a vehicle goes off rural roads it is likely to overturn when it strikes a ditch or embankment or is tripped by soft soil. Many other rollover crashes occur along freeways with grassy or dirt medians when a driver loses control at highway speeds and the vehicle slides sideways off the road and overturns when the tires dig into the dirt.

Approximately 214,700 passenger vehicles roll over annually in crashes that are severe enough to require towing (Research Note, NHTSA, 2001).

Rollovers have a higher fatality rate than other kinds of crashes. While rollovers do not occur as frequently as other types of crashes, when they do occur, the result is often serious injury or death. Rollovers accounted for more than 10,000 fatalities in the United States each year, more than side and rear crashes combined. They also resulted in thousands of serious injuries (Rollover Resistance Ratings Information, National Highway Traffic Safety Administration (NHTSA), 2001).

BRIEF SUMMARY OF THE INVENTION

This invention is directed to a vehicle anti-rollover system for reducing the rollover force during a vehicle rollover.

The object of the present invention is to provide a vehicle anti-rollover system which minimizes the risk of a rollover crash and serious vehicle occupant's injuries during a vehicle rollover.

The vehicle anti-rollover system adapted to exclude a direct contact in an activated condition between its members and a road surface on the side where the vehicle is rolling over in a rollover crash, comprises a sensing means for detecting a vehicle rollover and at least one gas generator with a double guide device or double nozzle joined or connected to the vehicle.

The gas generator is adapted to generate a gas and to discharge a flow of the gas into an atmosphere, in a sideways direction of the vehicle and toward the road surface, on the side where the vehicle is rolling over under a rollover force of the vehicle, when the sensing means for detecting a vehicle rollover detects a vehicle's degree of tilt exceeding a predetermined angle and activates the gas generator.

The gas flow can have a predetermined, or an adjustable, or a modulative force or power based on the rollover force severity, and the gas is directed sideways through a double guide device or double nozzle which can be adjustable.

The double guide device or double nozzle has wall portions surrounding the gas generator. The wall portions define a double guide device or a double nozzle interior containing the gas generator substantially therein such that the gas generator is enclosed within the double guide device or double nozzle.

The gas generator with its double guide device can be located on the roof or in other upper part of the vehicle for increasing the action of the discharging gas flow. The most preferred location of the gas generator is a location over or above a center of gravity of the vehicle.

The gas generator is designed to generate a gas flow when the vehicle is rolling over.

During a vehicle rollover or when the vehicle is rolling over, the rollover force of the vehicle is directed sideways where the vehicle is rolling over, while the reaction or reactive force induced by the force of the gas flow is directed sideways in an opposite direction and is applied to the vehicle.

Thus, the reaction or reactive force of the gas flow reduces the rollover force of the vehicle when the gas generator is activated by the sensing means for detecting a vehicle rollover.

The force of reaction is adapted to return or restore said vehicle to a former or previous condition which was prior to or before the rollover situation.

The objects and advantages of the vehicle anti-rollover system of the present invention, during a vehicle rollover, are:

(a) to provide an anti-rollover system which reduces the rollover force;

(b) to provide an anti-rollover system which minimizes the risk of a rollover crash;

(c) to provide an anti-rollover system which augments a vehicle ability to protect the occupants; and (d) to provide an anti-rollover system which reduces the occupant's risk of being killed or seriously injured in a rollover crash In next embodiment of the present invention, the vehicle anti-rollover system comprises means for activating the gas generator by the vehicle occupant in case of emergency to prevent the vehicle rolling over. In a vehicle unstable or rollover situation to avoid the vehicle rolling over, the vehicle can be stabilized almost instantly by the vehicle occupant when the vehicle occupant switches on or turns on means for activating the gas generator adapted to generate gas and to direct the flow of the gas sideways, to an atmosphere where the vehicle is rolling over, with a force of the gas flow enabling to reduce the rollover force.

Additional objects, advantages, and features of the present invention will become apparent from the following detailed description, taken together with the accompanying drawings.

BRIEF DESCRIPTION OF THE SEVERAL VIEWS OF THE DRAWING

The present invention, both as to its structure and manner of operation, may best be understood by referring to the following detailed description, taken in accordance with the accompanying drawings in which:

FIG. 4 is an enlarged front view of the gas generator with its double guide device or double nozzle of FIG. 1, shown for a usual condition in continuous lines and for activated condition in phantom lines; and FIG. 5 is a side view of the gas generator with its double guide device or double nozzle of FIG. 4, shown for a usual condition in continuous lines and for activated condition in phantom lines.

DETAILED DESCRIPTION OF THE INVENTION

Figure 1:
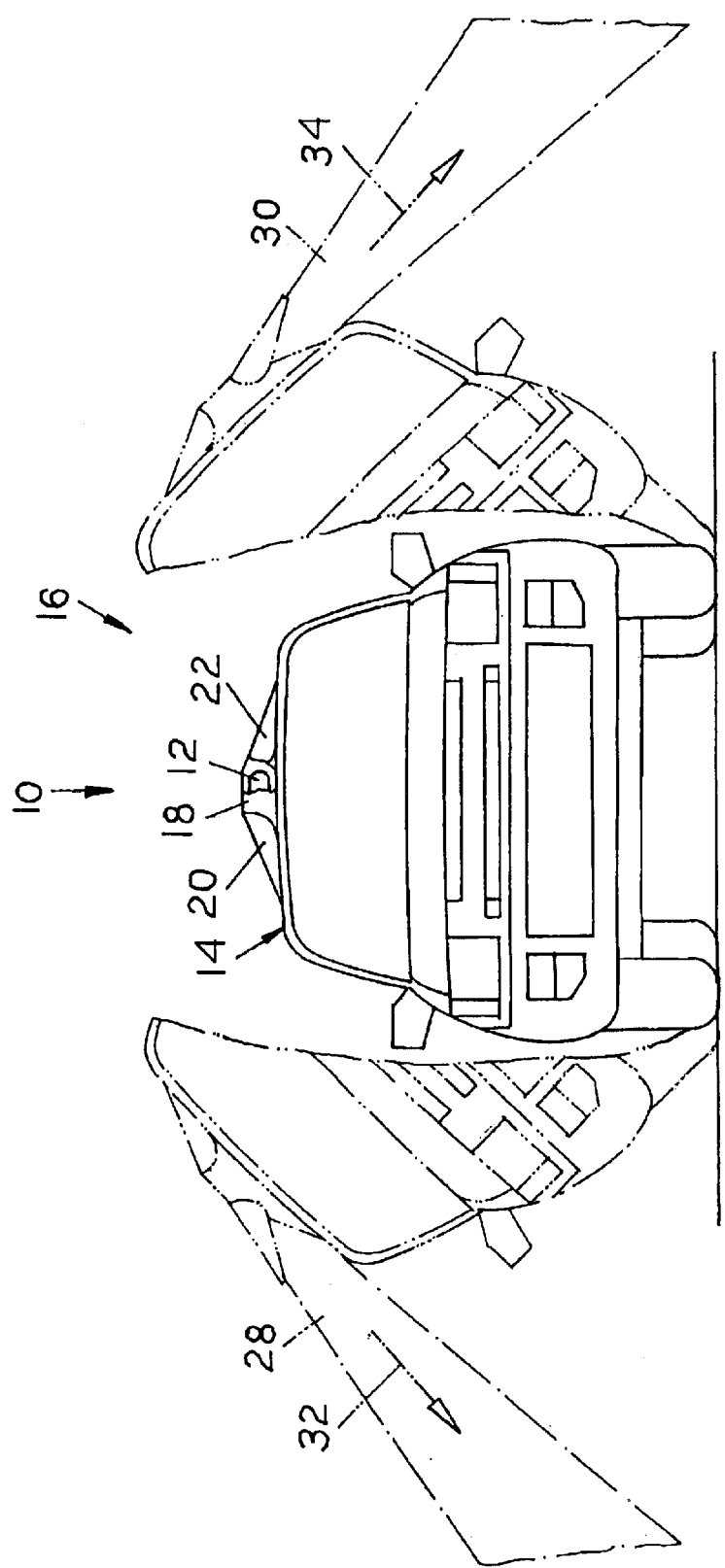
FIG. 1 is a front view of a vehicle with a gas generator located on the roof of the vehicle and adapted to direct a gas flow sideways in accordance with the present invention, shown for a usual vehicle situation (in which the anti-rollover system has not been activated) in continuous lines and for vehicle rollover situation (in which the anti-rollover system is activated) in phantom lines.

Referring first to FIG. 1 there is shown a front view of a vehicle 16 with an anti-rollover system 10 of the present invention for reducing the rollover force during a vehicle rollover or when the vehicle is rolling over, shown for a usual vehicle situation (in which the anti-rollover system 10 has not been activated) in continuous lines and for vehicle rollover situation (in which the anti-rollover system 10 is activated) in phantom lines.

Figure 2:
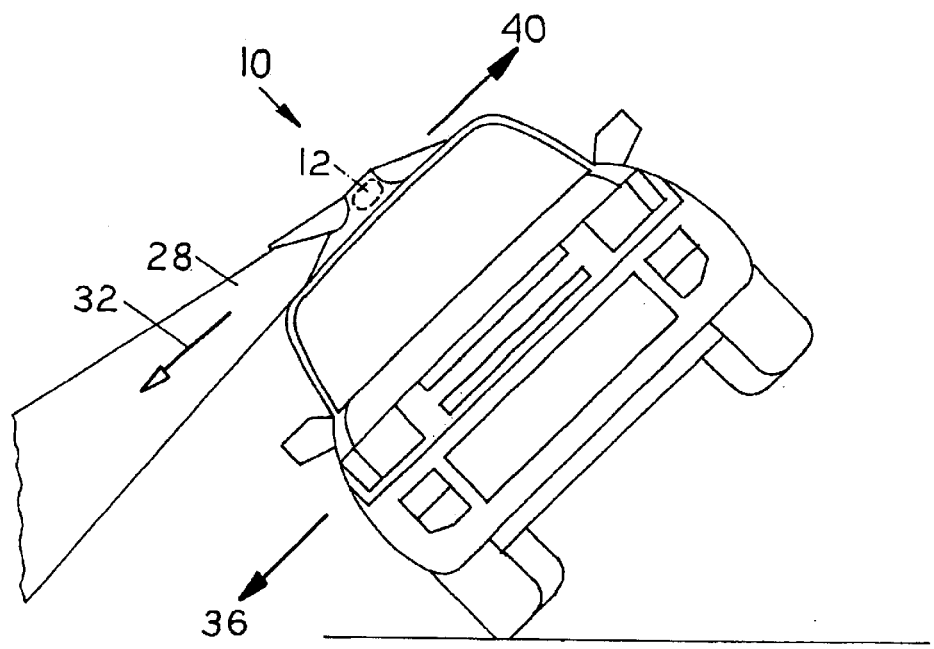
FIG. 2 is a front view of the vehicle of FIG. 1 with the anti-rollover system activated and with arrows showing the direction of the gas flow, of the rollover force, and of the reactive force during a vehicle left rollover.
Figure 3:
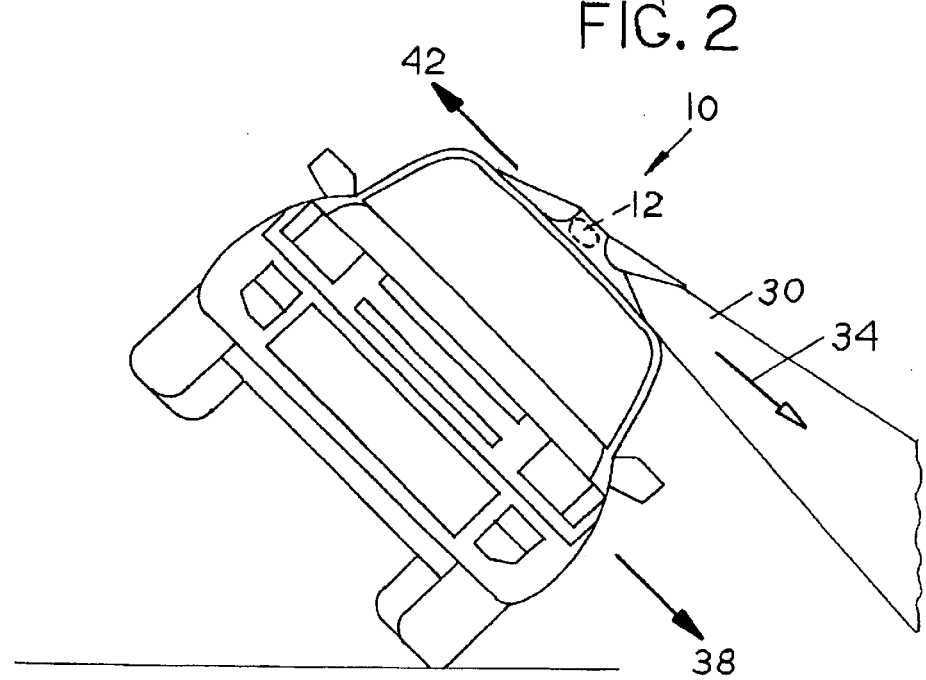
FIG. 3 is a front view of the vehicle of FIG. 1 with the anti-rollover system activated and with arrows showing the direction of the gas flow, of the rollover force, and of the reactive force during a vehicle right rollover.

Referring next to FIGS. 2 and 3 there is shown a front view of the vehicle 16 with the anti-rollover system 10 activated and with arrows showing the directions of the gas flows 32 and 34, of the rollover forces 36 and 38, and of the reactive forces 40 and 42 during the vehicle left and right rollovers accordingly.

The vehicle anti-rollover system 10 (FIGS. 1, 4, and 5) adapted to exclude a direct contact in an activated condition between its members and a road surface on the side where the vehicle is rolling over in a rollover crash, comprises: sensing means for detecting a left or right rollover of a vehicle (not shown), at least one gas generator 12 with a double guide device or double nozzle 18 joined or connected to the top or roof 14 of the vehicle 16, covers 20 and 22, and hinges 24 and 26. The gas generator 12 with its double guide device or double nozzle 18 also can be located in other upper parts (not shown) of the vehicle 16 for increasing the action of the discharging gas flow. The most preferred location of the gas generator is a location over or above a center of gravity of the vehicle. The double guide device or double nozzle 18 is directed sideways in a transverse direction of the vehicle 16.

The gas generator 12 is designed to generate a gas flow 28 or 30 (FIGS. 2 and 3) when the vehicle 16 is rolling over.

The gas generator 12 contains chemicals for igniting to generate or produce gas for discharge upon the existence of vehicle conditions. The gas generator 12 is rigid and preferably has an axially elongated body including parts (not shown) through which the generator gas discharges.

During a vehicle rollover or when the vehicle 16 is rolling over, the vehicle anti-rollover system 10 (FIGS. 1, 2, 3, 4, and 5) of the present invention works in the following way.

When sensors (not shown) detect a selected or a predetermined severity rollover and signal the control unit (not shown) to generate gas, the gas generator 12 being activated instantly generates gas and swings the cover 20 or 22 up on theirs hinges 24 or 26 depending on the side where the vehicle is rolling over. The activated gas generator 12 directs a flow of the gas 28 or 30 into an atmosphere in a sideways direction 32 or 34 of the vehicle and toward the road surface, on the side where the vehicle 16 is rolling over (FIGS. 1, 2, 3, and 4).

The rollover force 36 or 38 of the vehicle 16 is directed sideways where the vehicle 16 is rolling over, while the reaction or reactive force 40 or 42 of the gas flow 28 or 30 is directed sideways in an opposite direction (FIGS. 2 and 3).

Thus, the reaction or reactive force 40 or 42 of the gas flow 28 or 30 reduces the rollover force 36 or 38 (FIGS. 2 and 3) which minimizes or reduces the risk of a rollover crash or rolling over and serious vehicle occupant's injuries.

The force of reaction is adapted to return or restore said vehicle to a former or previous condition which was prior to or before the rollover situation.

The gas flow 28 or 30 can have a predetermined, or an adjustable, or a modulative force or power based on the rollover force severity, and the gas is directed sideways through a double guide device or double nozzle 18 (FIGS. 1, 4, and 5) which can be adjustable.

The double guide device or double nozzle 18 has wall portions surrounding the gas generator 12. The wall portions define a double guide device or double nozzle interior containing the gas generator 12 substantially therein such that the gas generator 12 is enclosed within the double guide device or double nozzle 18.

In next embodiment of the present invention, the vehicle anti-rollover system comprises means (not shown) for activating the gas generator by the vehicle occupant in case of emergency to prevent the rolling over of the vehicle 16. In a vehicle unstable or rollover situation to avoid the vehicle rolling over, the vehicle 16 can be stabilized almost instantly by the vehicle occupant when the vehicle occupant switches on or turns on means for activating the gas generator adapted to generate gas and to direct a flow 28 or 30 of the gas sideways, to an atmosphere where the vehicle 16 is rolling over, with a force of the gas flow 28 or 30 enabling to reduce the rollover force 36 or 38 (FIGS. 1, 2 and 3)

In comparison with current safety systems in existing and new vehicles which cannot provide complete occupant protection in severe rollover crashes which can cause serious occupant injuries, including fatal injuries—even when seat belts are properly worn and the air bags deploy, the present invention of the vehicle anti-rollover system will allow to protect a great many of occupants from receiving serious or fatal injuries.

While there has been shown and described preferred embodiment of the vehicle anti-rollover system of this invention, it is understood that various changes and modifications may be made by those skilled in the art without departing from the invention. The invention is defined in the following claims.

I claim:

1. A vehicle anti-rollover system adapted to exclude a direct contact in an activated condition between its members and a road surface on the side where said vehicle is rolling over in a rollover crash, comprising:

at least one gas generator attached to a vehicle, adapted to produce flow of gas; at least one double guide device or double nozzle with hingedly attached covers to discharge a flow of said gas into an atmosphere, said covers and hinges adapted to swing open and direct said gas flow in a sideways direction of said vehicle and toward said road surface, where said vehicle is rolling over under a rollover force of said vehicle, when a vehicle's degree of tilt exceeds a predetermined angle and activates said at least one gas generator;

said gas flow being adapted to generate a force of reaction, applied to said vehicle and directed sideways in an opposite direction to said rollover force of said vehicle, thereby reducing said rollover force of said vehicle, said force of reaction being adapted to return said vehicle to a former conditions which was prior to a rollover situation, whereby said reduced roller force minimizes the risk of a rollover crash and serious vehicle occupant's injuries.

2. A vehicle anti-rollover system adapted to exclude a direct contact in an actuated condition between its members and a road surface on the side where said vehicle is rolling over in a rollover crash, comprising:

at least one gas generator with at least one double guide device or double nozzle connected to vehicle top above center of gravity;

covers with hinges adapted to discharge a flow of gas laterally into an atmosphere outside said vehicle through said double guide device or double nozzle, in a direction of a rollover force of said vehicle and toward said road surface on the side where said vehicle is rolling over under said rollover force of said vehicle, when said at least one gas generator is actuated during a vehicle rollover;

said gas flow being adapted to produce a force applied to said vehicle and directed sideways in an opposite direction to said rollover force of said vehicle, thereby reducing said rollover force of said vehicle, said produced force being adapted to return said vehicle to a previous condition which was prior to a rollover situation, whereby said reduced rollover force minimizes the risk of a rollover crash and serious vehicle occupant's injuries.

3. A vehicle anti-rollover system designed to exclude a direct contact between its members and a road surface in an actuated condition on the side where said vehicle is rolling over in a rollover crash, comprising:

at least one gas generator adapted to generate gas with at least one double guide device or double nozzle connected to the vehicle top; hinged covers adapted to expel a flow of said gas into an atmosphere, sideways of said vehicle and toward said road surface, on the side where said vehicle is rolling over under a predetermined rollover force of said vehicle, when said force of a rollover acts on said vehicle and actuates said at least one gas generator;

said gas flow being adapted to produce a force which is applied to said vehicle and directed sideways in an opposite direction to said rollover force of said vehicle, thereby reducing said rollover force of said vehicle, said produced force being adapted to restore said vehicle to a previous condition which was before a rollover situation, whereby said produced force stabilizes said vehicle and minimizes the risk of a rollover crash and serious vehicle occupant's injuries.

\* \* \* \* \*